March 20, 1945.  H. K. HARWICK  2,371,621
TRUCK, ESPECIALLY FOR RAIL CARS
Filed Aug. 19, 1942  3 Sheets-Sheet 1

INVENTOR
Henry K. Harwick,
BY John P. Tarbox
ATTORNEY

March 20, 1945.  H. K. HARWICK  2,371,621
TRUCK, ESPECIALLY FOR RAIL CARS
Filed Aug. 19, 1942  3 Sheets-Sheet 3
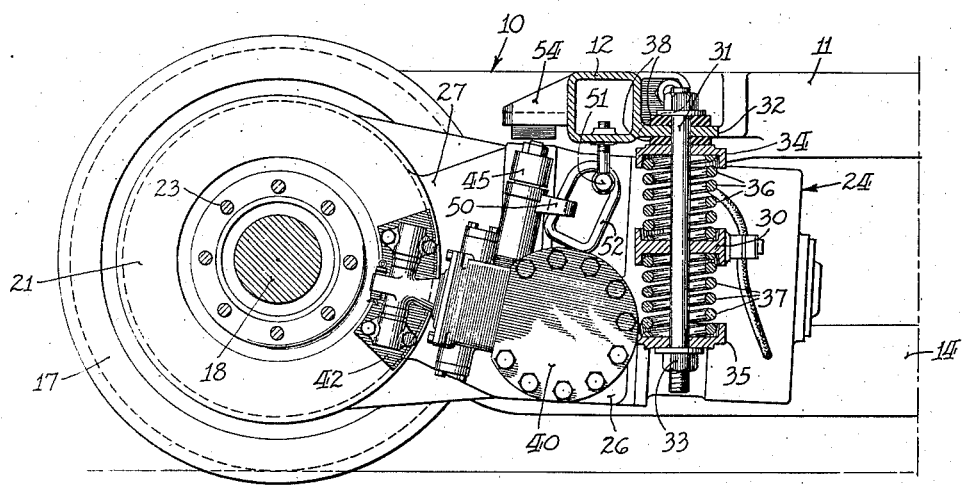
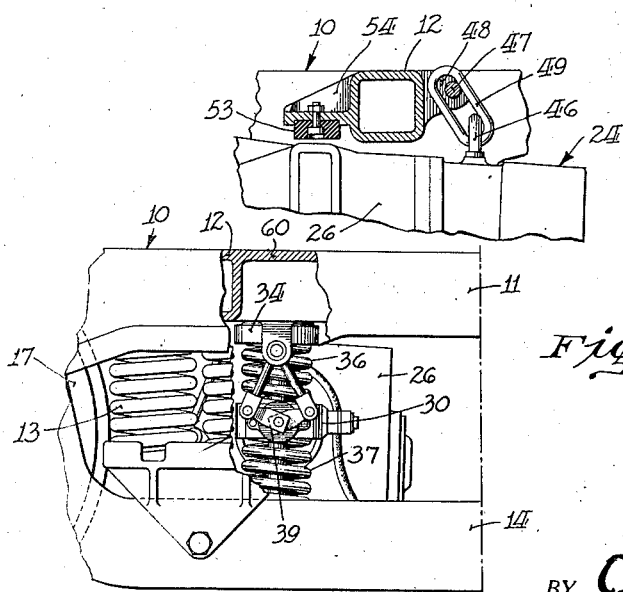
INVENTOR
*Henry K. Harwick,*
BY *John P. Tarbox*
ATTORNEY Patented Mar. 20, 1945

2,371,621

UNITED STATES PATENT OFFICE 2,371,621

TRUCK, ESPECIALLY FOR RAIL CARS

Henry K. Harwick, Darby, Pa., assignor to Edward G. Budd Manufacturing Company, Philadelphia, Pa., a corporation of Pennsylvania Application August 19, 1942, Serial No. 455,320

5 Claims. (Cl. 105—133)

The invention refers to a vehicle supporting truck, particularly to a railway vehicle truck. More specifically, the invention refers to trucks of the aforesaid type having a frame with side members and transoms and a bolster between a pair of transoms as well as at least one electric machine, preferably a pair of electric driving motors, suspended on said transoms.

Among the objects of the invention is a truck of the indicated kind having great strength and rigidity coupled with relatively light weight.

Another object of the invention is a truck of the indicated type providing ample space for accessories such as the driving gear and providing, furthermore, for good accessibility of the accessories.

The aforesaid objects and other advantages are achieved, according to the invention, by a new arrangement and form of the transoms and of the bolster.

Certain features of the invention are disclosed in the copending application Serial No. 509,608, filed November 9, 1943, which is a continuation of application Serial No. 399,060, filed June 21, 1941, for "Motor truck and brake mechanism," of Reuben H. Horton, Carolus L. Eksergian and the present inventor, of which the instant application is a continuation-in-part.

Further objects, advantages and the details of the invention will become apparent from the following description of an embodiment thereof when read in conjunction with the attached drawings showing such embodiment.

In the drawings:

Figure 4 is a side elevation of the left hand part of the truck partly in section along line 4—4 of Figure 1;

Figure 5 is a fragmentary view of the motor suspension in the section through one of the transoms along the longitudinal center line of the truck, and;

Figure 6 is fragmentary side elevation partly in section along line 6—6 of Figure 1.

Figure 1:
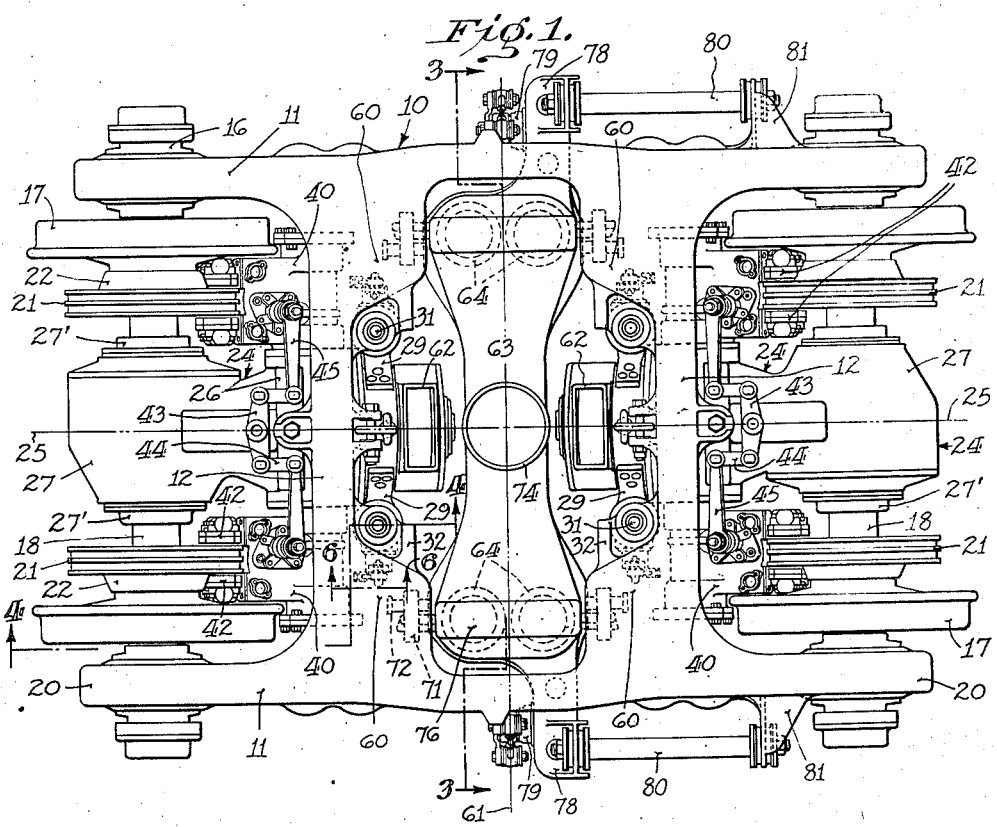
Figure 1 is a plan view of the truck.
Figure 2:
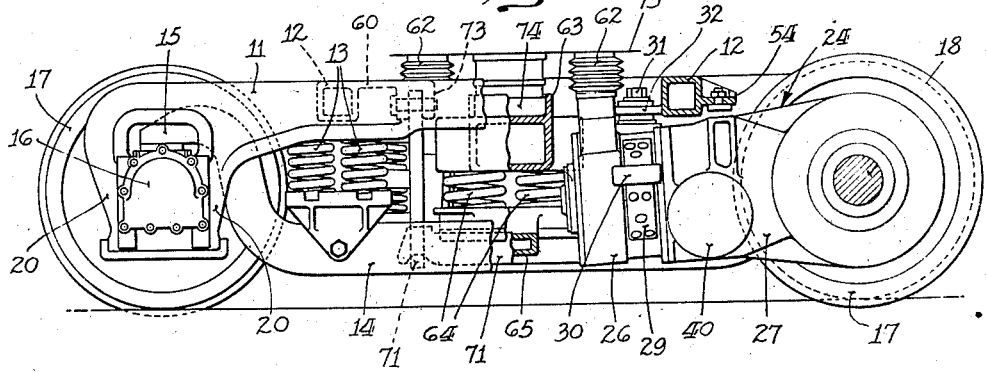
Figure 2 is a side elevation of the same truck, certain parts being broken away and others shown in section.
Figure 3:
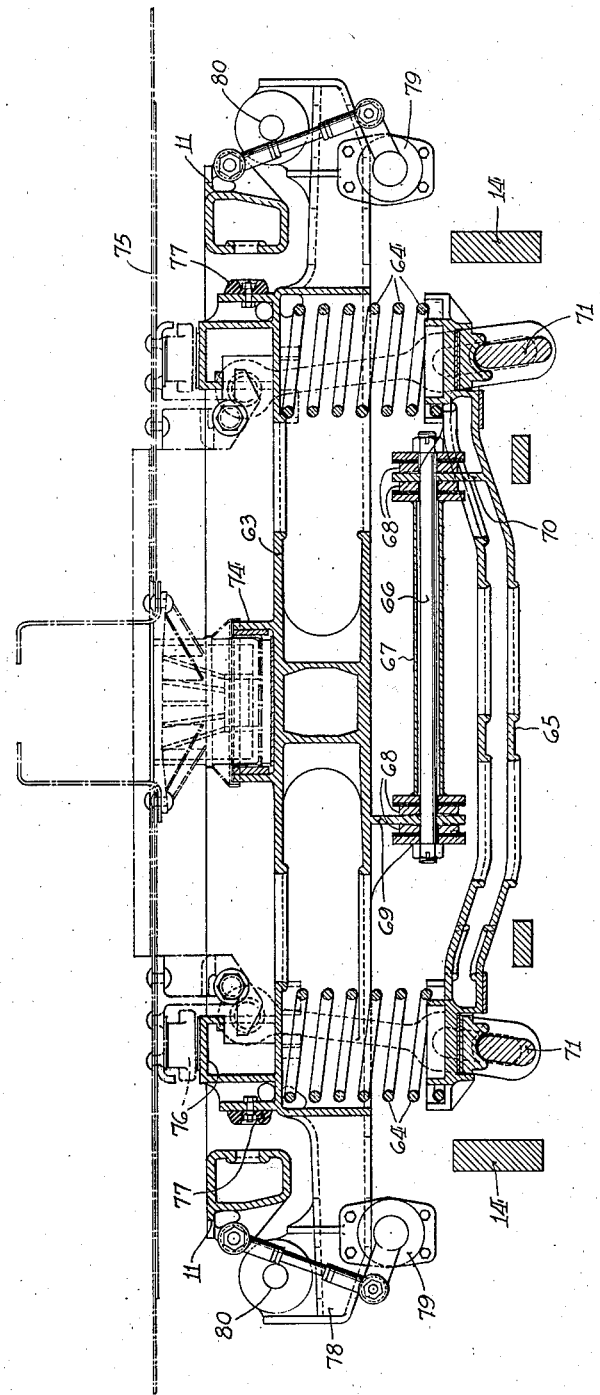
Figure 3 is a section substantially along line 3—3 of Figure 1 viewed in the direction of the arrows on said line yet on a larger scale than Figure 1.

The truck illustrated in the drawing comprises a frame designated generally by 10. This frame includes side frame members 11 interconnected by transoms 12. The truck may be spring-supported by springs 13 which are inserted between the said frame members 11 and equalizer bars 14. The latter have their ends offset vertically upwardly at 15 and these offset ends 15 rest on top of the axle boxes 16. The axle boxes form parts of the two wheel and axle assemblies including the wheels 17 and axles 18. Each axle 18 is suitably journalled at its ends in the journal boxes 16. The side frames 11 are formed at their ends with the usual spaced pedestals 20, receiving and guiding the adjacent axle box 16 for relative vertical movement.

Associated with each wheel 17 of the wheel and axle assembly is a rotary brake disc 21 secured to the hub of the wheel by a mounting member 22 and bolts 23.

There are two motor assemblies 24, one for each axle. Each motor assembly 24 is arranged with its longitudinal axis, as 25, extending at right angles to the axle 18. The motor is preferably housed in a strong motor casing, as 26, which may be an extension of and radially secured to the gear casing 27 surrounding and rotatably supported centrally of the axle between the rotary brake members by spaced bearings indicated at 27'. It will be understood that the electric motor drives the axle through appropriate gearing, not shown, within the gear casing 27.

As shown in the drawings, each motor casing extends inwardly beneath one of the transoms 12 and is resiliently suspended therefrom. Such resilient suspension may comprise brackets 29 rigidly secured to the opposite sides of the motor casing and each having horizontal cupped seat portions 30 which are centrally perforated to receive a supporting bolt 31 therethrough. Each such bolt passes through a hole in a ledge 32 strongly braced to the body of the transom 12 and has its head resting on top of this ledge. The lower end of this bolt is provided with a nut 33, and spring-seating upper and lower cups 34 and 35 are threaded onto the bolt. Between the horizontal cupped seat portion 30 of each bracket and the associated upper and lower cups 34 and 35, respectively, are arranged the coil springs 36 and 37, which act to cushion the weight of the motor in passing over track irregularities. Sound-deadening means, such as rubber washers 38, may be arranged between the head of the supporting bolt 31 and the ledge 32, and between said ledge and the upper cup 34.

Additionally, shock absorbing means, such as indicated at 39, may be arranged between the frame 10 and each of the brackets 29, 30 of the motor casing.

The combined motor and gear casings 26, 27 so supported with their longitudinal axis 25 at right angles to the axles 18 leave lateral spaces between them and the side frames 11 free for the reception of brake mechanisms for cooperation with the respective rotary disc brake members 21. Since the motor casing 26 is further supported from the transom 12 of the truck frame 10, it provides a convenient support for the said brake mechanism.

The brake mechanism for each axle may comprise a pair of brake cylinder units 40 which are bolted to the motor casing 26. Pistons, not shown, in said cylinders and lever systems serve for actuating the brake shoes 42 which latter cooperate with the brake discs 21. In addition to the aforesaid fluid-actuating means, manual brake actuating means may be provided; such means include the equalizer bar 43, links 44 and levers 45. The details of the brake mechanism, which do not form part of the present invention, are disclosed in the aforesaid application Serial No. 509,608 and in the copending application of Carolus L. Eksergian, Serial No. 399,779, filed June 26, 1941, for "Double disc brake assembly."

As a safety feature, means are provided for preventing the dropping of the motor casing to the tracks upon failure of the resilient support therefor from the transom. Such means may comprise an eye bolt 46 secured to the top of the motor casing 26, a bolt 47 extending through spaced lugs 48 projecting from the transoms 12 and a loose interconnection between the two bolts in the form of a link 49. The link is of a length to come into play only in the event of the failure of the usual resilient support. This safety means may be supplemented by similar means arranged between each of the cylinder units 40 and the transoms 12. Such means comprise an eye 50 on the cylinder unit, a transverse bolt 51 supported from the transoms 12 and a loose link 52 interconnecting the eye and bolt.

To prevent metal-to-metal contact between motor casing 26 and transoms 12, upon vertical oscillation of the casing, a rubber buffer, as 53, may be secured to a bracket 54 projecting from the transoms 12 and in position to be engaged by the casing 26 upon such oscillation.

The main bodies of the transoms 12 are closed box sections and are arranged close to the wheels 17. The transoms form in the illustrated embodiment one integral casting with the side frame members 11, the middle portions of the latter being likewise box sectional, whereas they are downwardly open at the ends 20 for the reception of the equalizer bars 14. The middle portion of each transom 12 is comparatively narrow, whereas its ends are widened by portions 60 extending toward the transverse middle line 61 of the truck. The hereinbefore described supporting ledges 32 extend from the central main portion of the transoms 12 and from the widened end portions 60 thereof. The transom with its widened ends may also be described as a wide transom which has a middle portion of reduced width.

The widened end portions 60 insure an extremely strong connection between the main bodies of transoms 12 and the side frame members 11, offer a basis for attachment of the aforesaid ledges 32 and leave between them space for the rear end of the motor casing 26. This end of the motor casing houses the motor brushes and has attached to it a bellows 62 for drawing in cooling air. The widened portions 60 of the transoms 12 serve also for other important purposes which will become apparent later on.

Arranged between the transoms 12 and their widened ends 60 is a bolster 63. This bolster 63 rests by means of springs 64 on a spring plank 65. Bolster 63 and plank 65 are tied to each other against lateral relative movement by a rod 66 and a sleeve 67, the ends of which engage by means of resilient discs 68 and by lugs 69 and 70 which latter form respectively a part of the bolster and the spring plank.

The spring plank 65 is suspended from the truck frame 10 by hangers or stirrups 71. The upper ends of these hangers 71 are journalled by means of bolts 72 to downwardly extending lugs 73 cast on the extensions 60 of the transoms 12.

It will be noted that the bolster 63 and the spring plank 65 are so wide at their ends that they approximately fill the entire space between the widened ends 60 of the transoms, thereby providing ample space for the supporting springs 64 and allowing a convenient arrangement of the hangers 71. The central portions of the bolster and spring plank are narrower than their ends, thereby increasing the space available for the ends of the motor casings 26.

The central portion of the bolster carries by the usual center bearing 74 the body, the lower portion of which is diagrammatically indicated at 75. Near the end of the bolster, customary side bearings 76 are provided between the bolster and the body and also resilient buffers 77 so as to prevent undue side-sway of the bolster relative to the truck frame.

The bolster has end projections 78 which extend outwardly beyond the truck side frame members 11 through the space between the latter and the equalizer bar 14. Attached to these extensions are shock absorbers 79 and one end of guiding means 80. The latter have their other ends attached to brackets 81 of the frame 10, are of a construction similar to the members 66 to 68 and serve for guiding the bolster 63 in an approximately vertical plane relative to the truck frame 10.

From the drawing and the foregoing description, it will have become apparent that the new arrangement and form of the transoms and of the bolster and spring plank, result in a truck of comparatively low weight yet of great strength and of simple construction, offering ample space for the driving motors and rendering vital parts of the motors easily accessible. Space is also provided for the means admitting cooling air to the motors. The great strength coupled with comparatively low weight is achieved by the arrangement of the main bodies of the transoms close to the wheels, thereby rendering comparatively short the projecting ends of the side member 11 which guide the wheels, by the strengthening of the middle portion of the frame through the widened end portions of the transoms and by using the wide end portions of the transoms not only for the support of the motor but also for the convenient attachment of the bolster hangers and shock absorbers. The form of the bolster and the spring plank with their narrow central portions contribute to their convenient attachment to the truck frame and provide ample supporting area for the springs between them.

While a specific embodiment of the invention has been shown and described, it will be understood that the invention is liable to modifications and adaptations without departing from the spirit and scope of the invention intended to be covered by the claims appended hereto. In particular, the invention is also applicable to trucks without a separate spring plank in addition to the bolster proper.

What is claimed is:

1. In a truck for supporting a vehicle, a frame comprising side members and transoms interconnecting them, said side members being supported near their ends by pairs of wheels, said transoms being arranged in longitudinal direction close to but between said wheels leaving a wide space between their main bodies, corner fillers being connected to said transoms and side members in the corners between them facing toward the centre of the truck, a bolster being supported by said frame in the space between said corner fillers, said bolster having comparatively wide ends and a narrow middle portion, the middle portions of said transoms, said corner fillers and the middle portion of said bolster surrounding wide openings, driving motors being suspended under the middle portions of said transoms and having their ends extended into the area of said openings so that their vital parts such as the brushes are easily accessible from above through said openings.

2. A vehicle truck comprising side frame members interconnected by transoms, two pairs of wheels each supporting one end of said members, two motors—one for each pair of wheels—suspended on said transoms and extending beneath the latter toward the respective pair of wheels, said transoms having a narrow middle part and widened ends extending toward the transverse middle line of the truck, said widened ends of the transoms being connected over their entire widths to said side members, a bolster, suspension means attached to the ends of said bolster and to the widened ends of said transoms, the width of said bolster near its ends being about equal to the space left between the widened ends of said transoms, the width of said bolster gradually diminishing toward its centre, the aforesaid arrangement providing for wide openings between the middle portions of said transoms and said bolster permitting access to portions of said motors for the purpose of inspection and repair, whereas the widened ends of said transoms and said bolster results in a very sturdy connection between these two parts.

3. A vehicle truck comprising a frame having side frame members interconnected by transoms; two pairs of wheels, each supporting one end of said side members; two motors, one for each pair of wheels, suspended on said transoms; said transoms having a narrow middle part and widened ends extending toward the transverse middle line of the truck, said widened ends of the transoms being connected to said side members; a bolster supported by said frame, the aforesaid arrangement providing for openings between the middle portions of said transoms and said bolster, cooling air conduits connected to said motors extending through said openings.

4. A vehicle truck comprising a frame having side frame members interconnected by a transom, a pair of wheels supporting one end of said side members, a motor for driving said wheels, arranged between the wheels and the transverse middle line of the truck a narrow middle part of said transom equaling in length about the diameter of the motor, the widened outer parts of said transom extending toward the transverse middle line of the truck and having their outer ends connected over their entire widths to said side members, a pair of suspension means for said motor being attached to the inner ends of said widened transom parts, the aforesaid arrangement providing for open space in the region of the narrow middle parts of said transom permitting access to said motor from above.

5. In a truck for supporting a vehicle, a frame comprising side members and transoms interconnecting them, said side members being supported near their ends by pairs of wheels, said transoms being arranged in longitudinal direction close to but between said wheels leaving a wide space between their main bodies, corner fillers being connected to said transoms and side members in the corners between them facing toward the centre of the truck, a bolster being supported by said frame in the space between said corner fillers, said bolster having comparatively wide ends and a narrow middle portion, the middle portions of said transoms, said corner fillers and the middle portion of said bolster surrounding wide openings, at least one electric machine such as a driving motor being suspended under the middle portion of one of said transoms and having its end extended into the area of one of said openings so that its vital parts such as the brushes are easily accessible from above through said opening.

HENRY K. HARWICK.